United States Patent [19]

Collard et al.

[11] Patent Number: 4,557,500
[45] Date of Patent: Dec. 10, 1985

[54] SUSPENSION FOR A MOTOR VEHICLE BY MEANS OF AN ELASTIC BLADE

[75] Inventors: Maurice Collard, Le Chesnay; Louis De Goncourt, Voisin Le Bretonneux, both of France

[73] Assignee: Bertin & Cie, Plaisir, France

[21] Appl. No.: 517,527

[22] PCT Filed: Nov. 19, 1981

[86] PCT No.: PCT/FR81/00150
§ 371 Date: Jul. 15, 1983
§ 102(e) Date: Jul. 15, 1983

[87] PCT Pub. No.: WO83/01758
PCT Pub. Date: May 26, 1983

[30] Foreign Application Priority Data

Nov. 18, 1981 [FR] France .................. 81 21569

[51] Int. Cl.[4] .............................. B60G 21/04
[52] U.S. Cl. ...................... 280/669; 267/19 R; 267/47; 267/54 R; 267/149; 280/699; 280/719
[58] Field of Search .......... 280/104, 686, 699, 718, 280/719, 720, 669; 267/36 R, 41, 47, 52, 54 R, 149, 19 R

[56] References Cited

U.S. PATENT DOCUMENTS

| | | | |
|---|---|---|---|
| 3,149,855 | 9/1964 | Adloff et al. | 280/669 |
| 3,219,333 | 11/1965 | Derschmidt et al. | 267/149 |
| 3,377,060 | 4/1968 | Sherwood | 267/47 |

FOREIGN PATENT DOCUMENTS

| | | | |
|---|---|---|---|
| 1805219 | 5/1969 | Fed. Rep. of Germany | 280/669 |
| 2927486 | 1/1981 | Fed. Rep. of Germany | 280/719 |
| 1079423 | 11/1954 | France. | |
| 1597358 | 7/1970 | France. | |
| 2520304 | 7/1983 | France | 280/719 |
| 724449 | 2/1955 | United Kingdom | 280/719 |
| 774211 | 5/1957 | United Kingdom | 280/669 |
| 914221 | 12/1962 | United Kingdom | 280/699 |

Primary Examiner—Joseph F. Peters, Jr.
Assistant Examiner—Kenneth R. Rice
Attorney, Agent, or Firm—A. W. Breiner

[57] ABSTRACT

A suspension consisting of an elastic leaf (17) made of a composite material, having in its plane of vertical symmetry a height which increases towards the end or ends supporting the wheels. The leaf is fixed to the chassis (21) at two points (22) which are symmetrical relative to the longitudinal axis of the vehicle. The leaf may be mounted longitudinally or transversely.

The leaf may consist of fibers extending longitudinally, without being cut, from one end to the other, embedded in an appropriate binder.

5 Claims, 7 Drawing Figures

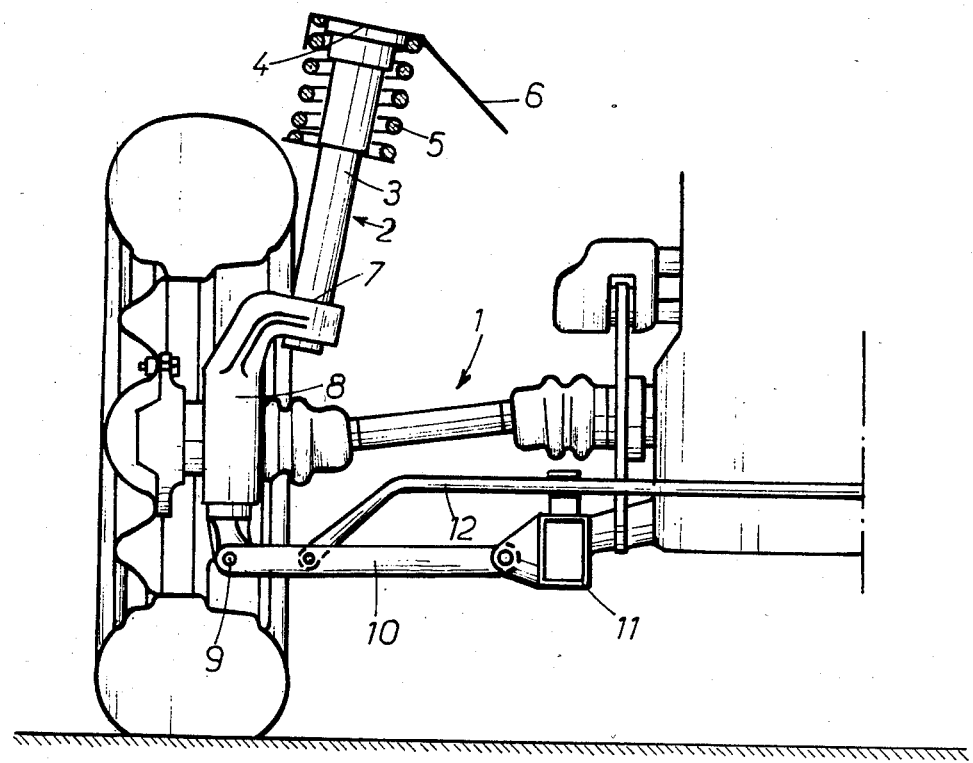
FIG.:1
PRIOR ART
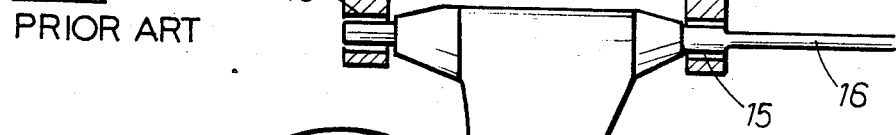
FIG.:2
PRIOR ART
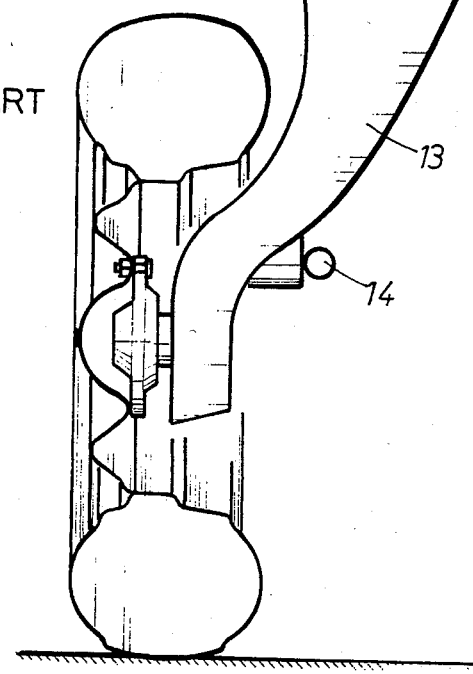

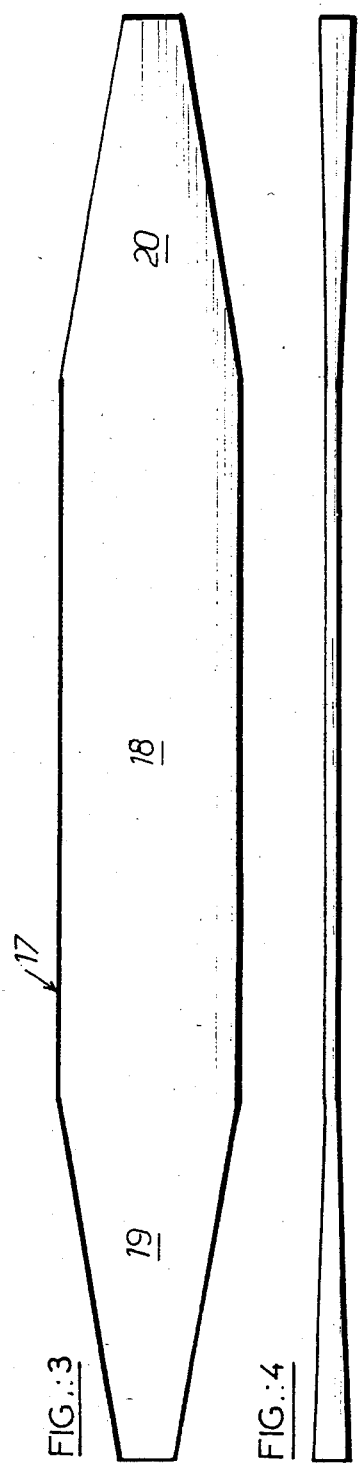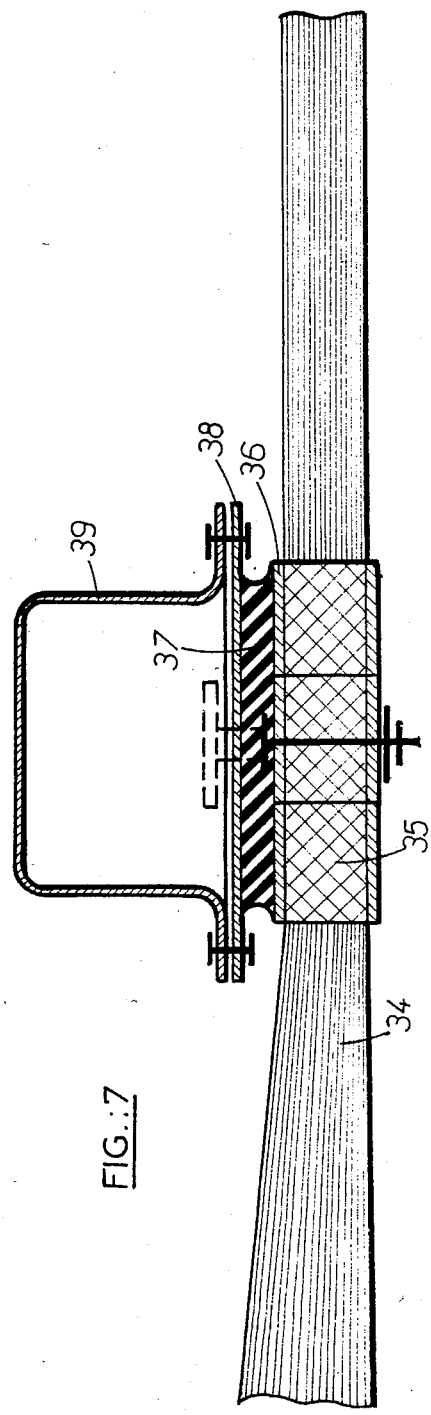

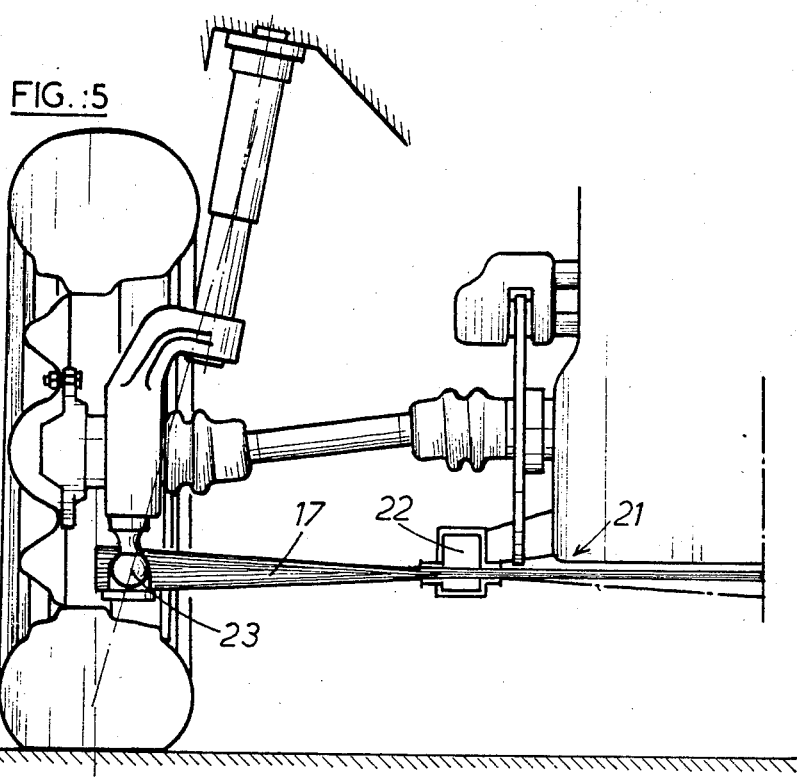
FIG.:5
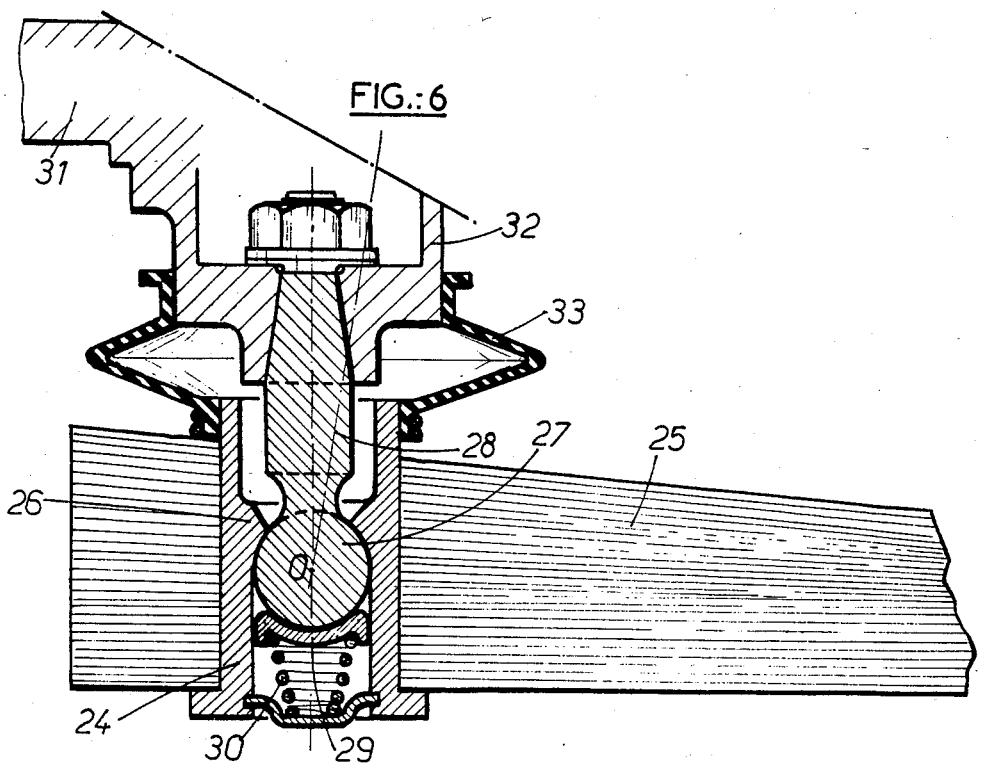
FIG.:6

SUSPENSION FOR A MOTOR VEHICLE BY MEANS OF AN ELASTIC BLADE

The invention is concerned with an automobile suspension with an elastic leaf, the said leaf being fixed to the chassis of the vehicle and carrying the wheel support at its free end.

The reduction in the fuel consumption of automobiles is a function of the reduction of their dead weight; consequently, research has been directed simultaneously towards developing engines having an improved output and towards the lightening of the engine as well as the bodywork and the suspension components. A front suspension of the conventional MacPherson type consists of a damper connected to a suspension spring fixed to a bodywork component and a triangle to transmit drag forces to the chassis. These suspensions are also equipped with a transverse bar which resists differential deflection of the wheels with respect to the body. This bar is variously called an anti-roll bar, a levelling bar or a stabilising bar. In this case, the triangle is sometimes replaced by a strut. In rear suspensions, the springs are often replaced by torsion bars which carry the wheel arms. Manufacturers have sought to replace or to eliminate certain suspension components. For this reason, French Pat. No. 1,079,423 describes a front suspension in which the strut or the triangle has been replaced by a flexible leaf fixed between the chassis and the swivel of the stub axle pivot. This leaf, having a triangular shape in plan, supports the chassis by means of an area of predetermined curvature which gives it a variable elasticity.

The aim of this modification is not the lightening of the suspension, but a reduction of the lateral forces borne by the guiding components, and of the number of necessary joints.

French Pat. No. 1,597,358 proposes a solution in which the spring damper is eliminated and replaced by a transverse leaf spring fixed to the bodywork at two points which are symmetrical relative to its longitudinal axis. The ends of the springs support the wheels and a clamp connects the wheel support to the bodywork. This arrangement is aimed at reducing the number of necessary joints between the wheel support and the bodywork, and by eliminating the helical suspension spring, reducing the occupied space.

The aim of the suspension, which is the subject of the invention, is a reduction in weight obtained mainly by eliminating the helical suspension spring, the triangle or strut, and by at least lightening the levelling bar. These different components are replaced by an elastic leaf made of a composite material having, in its plane of vertical symmetry, a height increasing from its fixing point on the chassis to the end supporting the wheel.

The explanations and figures, given below by way of example, will permit the understanding of an embodiment of the invention.

FIG. 1 shows in section one half of a conventional front axle of a vehicle.

FIG. 2 shows one half of a conventional rear axle of a vehicle.

FIGS. 3 and 4 show an embodiment of an elastic leaf according to the invention.

FIG. 5 is a sectional view of one half of a front axle equipped with a leaf according to the invention.

FIG. 6 is a sectional view of the connection of the leaf to the pivot.

FIG. 7 is a sectional view of the connection of the leaf to the body.

The front suspension 1 (FIG. 1) of the MacPherson type incorporates a swivel-damper component 2. Between the end 3 of the damper body and the end 4 of its rod, the helical suspension spring 5 is fixed. The end 4 of the rod is fixed to a reinforced portion of the body 6. The other end 7 of the swivel-damper body is fixed to the wheel hub support 8 and carries at its end a swivel 9 which co-operates with the apex of a triangle or with the end of a strut 10 fixed to the chassis 11.

The helical spring 5 may be replaced by a torsion bar fixed to the triangle or strut 10 at one end, and to the chassis 11 at the other end.

The left and right triangles or struts 10 may be joined by a stabilising bar 12.

The rear suspension (FIG. 2) is independent for each wheel and each wheel is supported by an arm 13 connected to the body by a damper 14, and to the chassis by a joint 15 whose rotary movement is controlled, for example, by a torsion bar 16. In certain embodiments, this bar is replaced by a helical spring as for the front suspension. The left and right components may also be joined by a stabilising bar.

Each component of the suspension has a clearly defined function outlined below.

The helical spring or the torsion bar ensures that the vehicle returns vertically to its static equilibrium position. Its stiffness controls the deflection under load.

The strut or the triangle transmits tractive or braking forces from the wheel to the chassis and ensures the geometrical positioning of a particular point in the suspension, that of the front wheel pivot, for example.

The accurate guiding of the wheel and the transmission of drag forces require two attachment points on the chassis, provided either by the triangle, or by the combination of the strut and the levelling bar.

The stabilising bar limits the inclination of the vehicle in the case, for example, of a bend in a level road. This bar provides the roll resistance of the vehicle in association with the springs, but does not intervene in symmetrical deflections of the right and left wheels, relative to the chassis, known as tramping.

The suspension, according to the invention, consists of an elastic leaf made of a composite material having, in its plane of vertical symmetry, a thickness which increases towards the end or ends supporting the wheel, and in its horizontal plane, a large breadth in the region of the mountings.

The characteristics of such a leaf enable the suspension springs, or torsion bars, to be eliminated, together with the triangle or strut. In some cases, the stabilising bar may be eliminated or lightened.

FIGS. 3 and 4 show an embodiment of a leaf 17, according to the invention, intended more particularly to be incorporated in a front axle.

The leaf, viewed from above (FIG. 3), has a central portion 18 of rectangular shape and small thickness (FIG. 4) terminated by two trapezoidal portions 19 and 20, which thicken towards their ends. According to the characteristics required of the leaf, the central portion 18 is relatively long so as to ensure maximum flexibility in this zone. When the leaf is not under stress or load, it is curved in its vertical plane.

The leaf may also have only one trapezoidal end; the application of such leaves will be described later.

FIG. 5 shows one half of a front axle provided with a transverse leaf 17. This leaf is fixed to the chassis 21 at two attachment points (only one of these points 22 is shown) equidistant from the longitudinal axis of the vehicle. The ends of the leaf support the wheels through stub axle pivots 23. The attachment of the leaf to the chassis and to the swivel will be described later.

In this type of suspension, the transverse leaf supporting the two wheels has a partial or total levelling effect which enables the conventional stabilising bar to be either lightened, or eliminated.

According to another type of front or rear suspension, the transverse or longitudinal leaves have only one trapezoidal end and only support a single wheel. In this case, there is no levelling effect and it is necessary to provide stabilising bars.

The use of elastic leaves for the rear suspension enables the arms and the spring components (helical spring or torsion bar) to be eliminated.

Suspensions with transverse leaves supporting a single wheel are constructed with two leaves with a single trapezoidal end, whose thinnest portions lie side by side under the whole width of the chassis.

Suspensions with longitudinal leaves are constructed with leaves having a single trapezoidal end, whose overall length is a function, among other factors, of the required elasticity.

The connection between the wheel support and the suspension leaf incorporates, according to an embodiment shown in FIG. 6, a metallic tubular insert 24 fixed in the thick end of the suspension leaf 25. This insert has a collar 26 on its internal surface forming a seat for the spherical end 27 of the stub axle pivot 28. The spherical end 27 is held pressed against the seat by means of a spherical cup 29 carried by a compression spring 30. The collar 26 is arranged in such a way that in relation to the diameter of the spherical portion 27 of the stub axle pivot, the centre 0 of the spherical portion is on the neutral axis of the elastic leaf. The stub axle pivot is fixed to the wheel stub axle 31 and to one end of the damper leg 32 by known means. A sealing bellows 33 is fixed between the damper leg 32 and the end of the tubular insert 24 to prevent the penetration of dust into the joint.

The connection between the wheel support and the suspension leaf is constructed in the conventional manner either with a swivel, in the case of a front suspension, with a pivot such as that described above, or with a link component for a rear suspension. The centre of the point of connection, of either the swivel or the adapter component, is fixed in the plane of the leaf so as to prevent any twisting of the latter.

According to another type of connection not shown, the end of the leaf is inserted into and fixed in a housing of a metal component incorporating a bore into which the spherical end of the stub axle pivot penetrates, where it is held, for example, by means similar to those described in the preceding embodiment.

FIG. 7 shows an example of a flexible mounting between the chassis and the suspension leaf. In this illustration, the leaf is transverse, but a similar mounting may be used for a longitudinal leaf.

The leaf 34 is inserted into a casing 35 in which it is held by any known means, such as by adhesive, by fixing with pins, etc. The upper wall 36 of the casing carries a block of elastomer 37, to which a fixing plate 38 is fixed, for example by vulcanisation.

The fixing plate is, for example, bolted to the chassis member 39.

The block of elastomer 37 has a different capability for deflection in the transverse direction from that in the longitudinal direction of the vehicle. Its deflection is small in the longitudinal direction, in order to transmit the tractive and braking forces, and is large in the transverse direction, in order to absorb the variations in the length of the leaf resulting from its deflection in the vertical plane.

Other commercially available systems may be used to provide the mounting between the chassis and the leaf. Thus, during manufacture of the leaf, an opening may be provided which is capable of accepting an elastic contact member fixed directly or indirectly to the chassis or chassis members.

According to different embodiments of the suspension:

when the leaf is transverse and supports two wheels, two flexible mountings to the chassis are provided, positioned symmetrically relative to the axis of the vehicle;

when the leaf is transverse and supports a single wheel, two flexible mountings to the chassis are provided, as in the preceding example;

when the leaf is transverse or longitudinal and supports a single wheel, one flexible mounting and one rigid mounting are provided; either of these mountings may be on the side nearer the supported wheel.

The use of suspension leaves in accordance with the invention allows the suspension to be lightened significantly. The overall gain for front and rear suspension is of approximately ⅓ of the weight of a conventional suspension with suspension spring, triangle or strut, and stabilising bar.

The suspension leaf may be made either by cutting out a layered profile of longitudinal glass fibers and epoxy resin, or, according to a preferred method, by molding, the number of fibers remaining constant from one end of the leaf to the other, that is to say the fibers extending without being cut (without being machined) from one end of the leaf to the other, and the cross-section remaining constant throughout the length of the leaf.

The latter construction enables leaves to be produced which have a very high fatigue resistance.

The glass fibers of the preceding example may be replaced by other mineral or organic, natural or synthetic fibers bound with an appropriate binder.

We claim:

1. An automobile suspension comprising a vehicle chassis, a wheel support, a damper, an elastic leaf having two free ends made of a composite material, and mounting means for mounting said leaf to said chassis; said leaf being fixed by said mounting means spaced from one of said free ends to said vehicle chassis and supporting at said free end said wheel support and said damper, said elastic leaf comprising a first section having a width and a thickness approximately constant and said first section extending approximately in a horizontal plane under said chassis between mounting means, and a second section with a decreasing width and an increasing thickness, said second section extending from said mounting means to the free end, the plane of symmetry of the free end being approximately perpendicular to the horizontal plane; said first and second sections of the leaf having constant and equal cross-sectional areas.

2. An automobile suspension as claimed in claim 1 wherein said leaf comprises fibers extending longitudinally from one end to the other, embedded in an appropriate binder.

3. An automobile suspension as claimed in claim 1 wherein the first section of said leaf extends between two of said second sections, said leaf lying transverse to the longitudinal axis of the vehicle chassis.

4. An automobile suspension as claimed in claim 1 wherein two of said leafs are fixed parallel to the longitudinal axis of the vehicle chassis.

5. An automobile suspension as claimed in claim 1 wherein the free end of said leaf is provided with a swivel comprising a spherical end cooperating with a spherical cup wherein the center of the spherical end is on the neutral axis of the elastic leaf.

* * * * *